United States Patent
Muraho et al.

(10) Patent No.: US 8,937,451 B2
(45) Date of Patent: Jan. 20, 2015

(54) MOTOR CONTROL APPARATUS WHICH DISCHARGES STORED CHARGE OF DC VOLTAGE SMOOTHING CAPACITOR WHEN OPERATION BECOMES HALTED

(75) Inventors: Tomoyuki Muraho, Nagoya (JP); Tsuneo Maebara, Nagoya (JP)

(73) Assignee: Denso Corporation, Kariya (JP)

( * ) Notice: Subject to any disclaimer, the term of this patent is extended or adjusted under 35 U.S.C. 154(b) by 676 days.

(21) Appl. No.: 13/219,280

(22) Filed: Aug. 26, 2011

(65) Prior Publication Data

US 2012/0049773 A1 Mar. 1, 2012

(30) Foreign Application Priority Data

Aug. 27, 2010 (JP) .................................. 2010-190902

(51) Int. Cl.
*H02P 27/04* (2006.01)
*H02P 27/06* (2006.01)
*H02M 1/32* (2007.01)

(52) U.S. Cl.
CPC ......... *H02P 27/06* (2013.01); *H02M 2001/322* (2013.01)
USPC ...................................................... 318/801

(58) Field of Classification Search
CPC .................. Y02T 10/7044; B60L 2210/14
USPC ...................................................... 318/801
See application file for complete search history.

(56) References Cited

U.S. PATENT DOCUMENTS

| 7,057,361 | B2 * | 6/2006 | Kitahata et al. | ............... 318/139 |
| 7,649,335 | B2 * | 1/2010 | Ishikawa et al. | ............ 320/104 |
| 7,868,569 | B2 * | 1/2011 | Iwashita et al. | ............... 318/376 |
| 2011/0139595 | A1 * | 6/2011 | Ishigaki | ..................... 200/52 R |
| 2013/0166131 | A1 * | 6/2013 | Shiiba et al. | .................... 701/22 |

FOREIGN PATENT DOCUMENTS

| JP | P2003-348856 A | 12/2003 |
| JP | P2005-020952 A | 1/2005 |
| JP | P2005-229689 A | 8/2005 |
| JP | P2006-210605 A | 8/2006 |
| JP | P2007-089257 A | 4/2007 |
| JP | 2009-232620 | 10/2009 |

OTHER PUBLICATIONS

Japanese Office Action dated Jul. 17, 2012, issued in corresponding Japanese Application No. 2010-190902 with English translation.

* cited by examiner

*Primary Examiner* — Erick Glass
(74) *Attorney, Agent, or Firm* — Nixon & Vanderhye PC

(57) ABSTRACT

A motor control apparatus has a plurality of DC-to-AC inverter circuits which supply respective electric motors, each inverter circuit formed of a plurality of switching circuits, all of the switching circuits being connected in parallel with a smoothing capacitor which smoothes a DC voltage. A charge which remains in the smoothing capacitor, after the source of the DC voltage has become disconnected, is discharged through a single switching circuit in each of the inverter circuits, with all other switching circuits of each inverter circuit being held in a non-conducting state, thereby preventing a flow of discharge current through any of the motors.

10 Claims, 3 Drawing Sheets

MOTOR CONTROL APPARATUS WHICH DISCHARGES STORED CHARGE OF DC VOLTAGE SMOOTHING CAPACITOR WHEN OPERATION BECOMES HALTED

CROSS-REFERENCE TO RELATED APPLICATIONS

This application is based on and incorporates herein by reference Japanese Patent Application No. 2010-190902 filed on 27 Aug. 2010.

BACKGROUND OF THE INVENTION

1. Field of Application

The present application relates to a motor control apparatus incorporating power inverter circuits formed of switching elements.

2. Description of Related Art

Types of motor control apparatus are known which incorporate a DC-to-AC inverter circuit (referred to in the following simply as an inverter circuit) formed of switching elements, for example as described in Japanese patent application publication No. 2009-232620 (designated in the following as reference 1). The inverter circuit of reference 1 is illustrated in the partial circuit diagram of FIG. 3 (based on FIG. 2 of reference 1). The motor control apparatus also includes a smoothing capacitor CN and a control apparatus (not shown in FIG. 3), and is connectable to a DC power source PW, with the positive and negative terminals of the DC power source PW connected to opposing terminals of the smoothing capacitor CN. The inverter circuit is formed of three switching circuits connected in parallel between the terminals of the smoothing capacitor CN. The three switching circuits are respectively formed of a series-connected pair of switching elements SW11, SW12, a series-connected pair of switching elements SW21, SW22, and a series-connected pair of switching elements SW31, SW32, as shown. The junction points of these three series-connected pairs of switching elements are connected to windings of a 3-phase motor M. The control apparatus switches each switching element between an "on" (conducting) state and "off" (non-conducting) state, to convert the DC voltage to a 3-phase AC voltage supply which is applied to the motor M.

After the inverter circuit has commenced operation, a high value of electric charge becomes stored in the smoothing capacitor CN, thereby smoothing the DC voltage from the DC power source PW. Subsequently, when the inverter circuit is disconnected from the DC power source PW, the stored charge in the smoothing capacitor CN remains unchanged. Hence, if the voltage of the DC power source PW is substantially high, there is a danger that the residual charge in the smoothing capacitor CN could cause electric shock to a person. For that reason, when the inverter circuit is disconnected from the DC power source PW, the control apparatus then applies control whereby all of the switching elements of the inverter circuit are set in the on state during an interval of specific duration. That duration is predetermined such that the electric charge in the smoothing capacitor will be sufficiently discharged, while ensuring that excessively high levels of current will not flow in the switching elements. The danger of electric shock can thereby be prevented.

However such a prior art apparatus has the following disadvantage. If there are deviations between the respective timings at which the switching elements of the inverter circuit become switched on, then a momentary high level of current will flow through the windings of the motor M. For example, if the switching elements SW11 (connected to the positive terminal of the smoothing capacitor CN) of one switching circuit, and the switching element SW22 (connected to the negative terminal of the smoothing capacitor CN) of a different switching circuit become switched on concurrently, before the remaining switching elements become switched on, then a momentary high level of current will flow through the motor windings via the switching elements SW11 and SW22. Such an accidental flow of current may cause the motor to momentarily rotate.

Furthermore even without such timing deviations, a similar problem may arise due to variations in device characteristics of the switching elements. For example if the "on" state resistance of a positive-side switching element (connected to the positive terminal of the smoothing capacitor CN) of one of the switching circuits is lower than the "on" state resistance of the positive-side switching elements of the two other switching circuits (e.g., if the "on" resistance of switching element SW11 is lower than that of the switching elements SW21 and SW31), then a current will flow through the motor windings when the charge in the smoothing capacitor is discharged.

SUMMARY

It is an objective to overcome the above problems, by providing a motor control apparatus whereby it is reliably ensured that a current will not flow in windings of a motor that is controlled by the apparatus, when a residual stored charge of a smoothing capacitor is discharged through switching circuits of the apparatus.

To achieve the above objective, according to a first aspect, an embodiment provides a motor control apparatus for driving a plurality of electric motors, with the apparatus including a smoothing capacitor for smoothing a DC voltage from a DC voltage source, a control circuit, and a plurality of DC-to-AC inverter circuits controlled by the control circuit. AC voltages (e.g., 3-phase AC voltages) thereby produced from the DC-to-AC inverter circuits are supplied to drive respective motors. Each of the DC-to-AC inverter circuits is formed of a plurality of switching circuits, each consisting of a pair of switching elements connected in series, with all of the switching circuits connected in parallel between opposing terminals of the smoothing capacitor, and with each junction between a pair of switching elements in a DC-to-AC inverter circuit being connected to windings of the corresponding motor.

Each switching element may comprise a semiconductor device such as an IGBT (Insulated Gate Bipolar Transistor) which is responsive to a control signal for being switched between a conducting condition ("on" state) and a non-conducting condition ("off" state).

The embodiment is characterised in that when the DC voltage source becomes removed, leaving a residual stored charge in the smoothing capacitor, the control circuit applies control whereby both of the switching elements of a single switching circuit in each of the plurality of DC-to-AC inverter circuits are set in the conducting state, so that the stored charge in the smoothing capacitor becomes discharged by current which flows through each of these single switching circuits. At the same time, the control circuit sets all of the other switching elements of each DC-to-AC inverter circuit in a non-conducting condition.

It is thereby made impossible for discharge current from the smoothing capacitor to flow through an on-state switching element (connected to one terminal of the smoothing capacitor) of one switching circuit of a DC-to-AC inverter circuit, through the motor windings, then through an on-state switching element of another switching circuit (which is connected to the opposite terminal of the smoothing capacitor) within the same DC-to-AC inverter circuit. It can thereby be ensured that no current will flow through the motor windings when the switching circuit is discharged. The above-described problem of the prior art is thereby eliminated.

From another aspect, the motor control apparatus may include a DC-to-DC converter circuit connectable to a source of a DC voltage, which is controlled by the control circuit for converting the DC voltage to a stepped-up DC voltage, with the DC-to-DC converter circuit including a switching circuit comprising a pair of switching elements connected in series, with the stepped-up DC voltage produced between first and second terminals of that switching circuit. In that case, the smoothing capacitor is connected between the terminals of the switching circuit of the DC-to-DC converter circuit, to provide a smoothed stepped-up DC voltage.

From that aspect of the embodiment, when the DC voltage source becomes disconnected from the DC-to-DC converter circuit, leaving a residual stored charge in the smoothing capacitor, the control circuit applies control whereby both of the switching elements of a single switching circuit in each of the DC-to-AC inverter circuits, and both of the switching elements of the switching circuit of the DC-to-DC converter circuit, are set in the conducting condition. The stored charge in the smoothing capacitor becomes thereby discharged by current which flows through respective single switching circuits of the plurality of DC-to-AC inverter circuits and of the DC-to-DC converter circuit. Concurrent with this, the control circuit sets all of the other switching elements in the non-conducting condition.

The residual stored charge of the smoothing capacitor can thereby be effectively discharged, and the danger of electric shock prevented.

As an alternative, the motor control apparatus may be configured with the control circuit enabled to diagnose a defective condition of any one of the aforementioned single switching circuits of the DC-to-AC inverter circuits. So long as such a defective condition is not detected, the control circuit performs control whereby the discharge current from the smoothing capacitor flows through each of these respective single switching circuits of the DC-to-AC inverter circuits. However if one of these single switching circuits is diagnosed as being defective, then (when the DC voltage source has become disconnected from the DC-to-DC converter circuit), the switching elements of the switching circuit of the DC-to-DC converter circuit and of the non-defective single switching elements of the DC-to-AC inverter circuits are each set in the conducting condition, while all other switching elements are set in the non-conducting condition. The function previously performed by the defective switching circuit is thereby replaced by the switching circuit of the DC-to-DC converter circuit. Effective discharging of the smoothing capacitor, and elimination of the danger of electric shock, is thereby ensured.

The motors which are supplied by the inverter circuits may have respectively different drive power capacities, so that the switching elements of respective inverter circuits may have differing power handling capabilities. The control circuit is preferably configured to control the levels of power dissipated by switching elements of the switching circuits during discharging of the residual charge, in accordance with respective power handling capabilities of the switching elements. Here, "power handling capability" signifies the maximum amount of power which can be safely dissipated by a switching element. In the case of IGBTs utilised as switching elements, this control is performed by setting a control voltage (gate-emitter voltage) applied to each switching element such as to limit the maximum level of discharge current passed by that switching element to an appropriate value, and thereby limit the dissipated power to an appropriate value. The residual charge of the smoothing capacitor is thereby effectively discharged while avoiding damage to switching elements.

When the switching circuits of the inverter circuits are disposed in a regular array pattern on a circuit board, the aforementioned single switching circuits of the inverter circuits are preferably disposed with separations between them, i.e., such as not to be located mutually adjacent to one another. This serves to prevent build-up of heat that is generated when capacitor discharge current flows through the switching circuits.

Such a motor control apparatus can be advantageously applied to control a plurality of drive motors (providing motive power) of a vehicle.

DESCRIPTION OF PREFERRED EMBODIMENTS

First Embodiment

Figure 1:
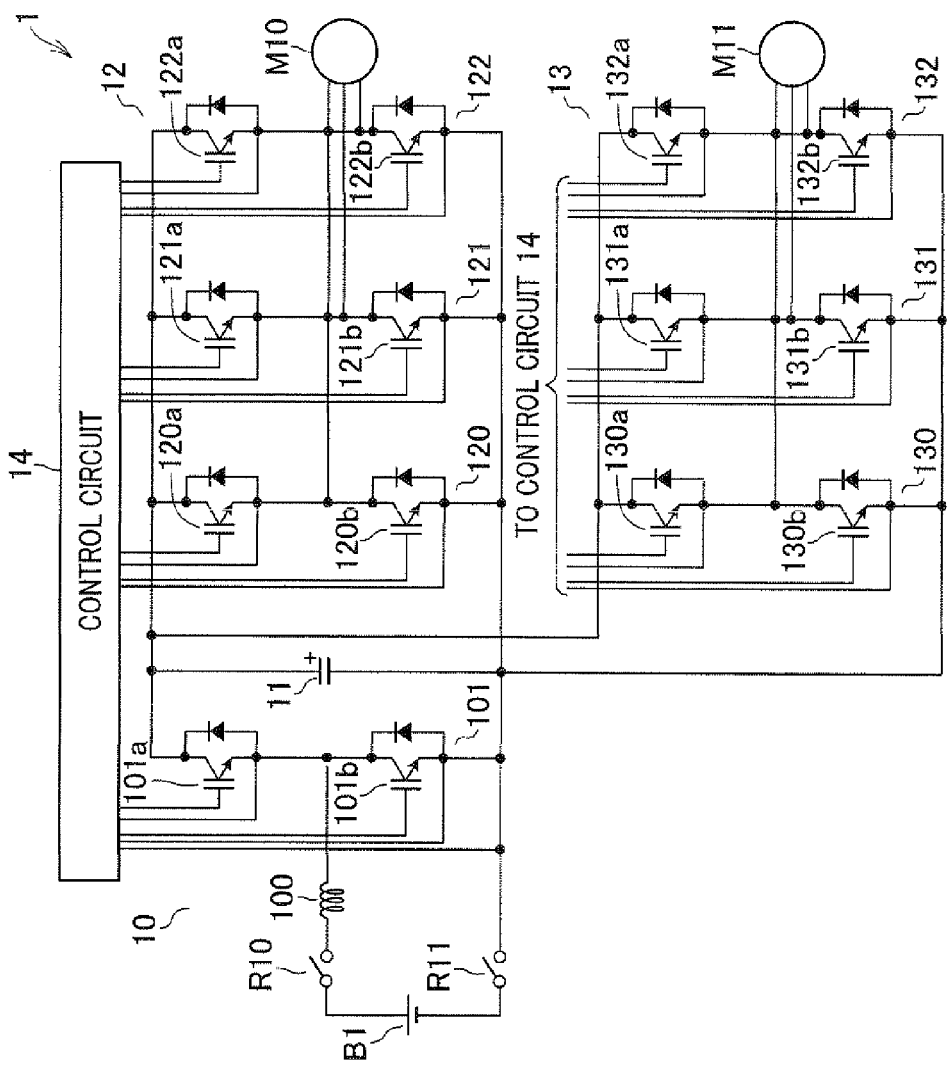
FIG. 1 is a circuit diagram of a motor control apparatus, for use in describing first, second and third embodiments of the invention.

FIG. 1 is a circuit diagram of a first embodiment of a motor control apparatus, designated by numeral 1. The motor control apparatus 1 is installed in a vehicle, and performs step-up of the voltage of a battery B1 of the vehicle to a higher DC voltage (for example, 288 V), and converts the stepped-up DC voltage to 3-phase AC voltages, supplied to two (motive power) drive motors M10 and M11 of the vehicle. The motor control apparatus 1 thereby controls the operation of the motors M10 and M11. The battery B1 is electrically isolated from the body of the vehicle in which the apparatus is installed.

As shown, the motor control apparatus 1 includes a DC-to-DC converter circuit (referred to in the following simply as a converter circuit) 10, a smoothing capacitor 11, and two DC-to-AC inverter circuits (referred to in the following simply as inverter circuits) 12 and 13. The converter circuit 10 steps up the DC voltage of the battery B1, which is smoothed by the capacitor 11 and supplied to the inverter circuits 12 and 13. The converter circuit 10 is made up of a coil 100 and a switching circuit 101.

The operation of the circuit is as follows. A flow of current through the coil 100 is repetitively interrupted by the action of the switching circuit 101, under the control of the control circuit 14. Energy thereby becomes alternately stored in and discharged from the coil 100, inducing a stepped-up DC voltage. One terminal of the coil 100 is connected via a relay R10 to the positive terminal of the battery B1 while the other terminal of the coil 100 is connected to the switching circuit 101.

The switching circuit 101 is formed of two IGBTs (insulated-gate bipolar transistors) 101a and 101b connected in series, with the emitter of the IGBT 101a connected to the collector of the IGBT 101b, and with that junction point of the IGBTs 101a, 101b connected to one terminal of the coil 100. The collector of the IGBT 101a is connected to the positive terminal of the smoothing capacitor 11, while the emitter of the IGBT 101b is connected to the negative terminal of the smoothing capacitor 11, and is also connected via a relay R11 to the negative terminal of the battery B1. The gate and emitter terminals of the IGBTs 101a, 101b are connected to the control circuit 14.

The inverter circuit 12 is controlled by the control circuit 14 to convert the smoothed stepped-up DC voltage to a 3-phase AC voltage which is supplied to the motor M10. The inverter circuit 12 also serves to discharge the accumulated charge of the smoothing capacitor 11, as described hereinafter, and is formed of three switching circuits 120, 121 and 122, connected in parallel to between the opposing terminals of the smoothing capacitor 11. The switching circuit 120 executes on/off switching to convert the stepped-up DC voltage to an AC voltage. The switching circuit 120 is formed of two IGBTs 120a and 120b connected in series, with the emitter of the IGBT 120a connected to the collector of the IGBT 120b, with these IGBTs having sufficient power-handling capability to drive the motor M10. The collector and emitter of the IGBT 120a are respectively connected to the positive and negative terminals of the smoothing capacitor 11.

As shown, the switching circuit 121 and the switching circuit 122 are respectively configured identically to the switching circuit 120. The switching circuit 121 is formed of two IGBTs 121a and 121b connected in series between the positive and negative terminals of the smoothing capacitor 11, while the switching circuit 122 is formed of two IGBTs 122a and 122b connected in series between the positive and negative terminals of the smoothing capacitor 11. Thus the collectors of the IGBTs 120a, 121a and 122a are connected in common to one terminal of the smoothing capacitor 11, and the emitters of the IGBTs 120b, 121b and 122b are connected in common to the other terminal of the smoothing capacitor 11.

The junction points of the pair of IGBTs 120a, 120b, of the pair of IGBTs 121a, 121b, and of the pair of the IGBTs 122a, 122b are respectively connected to windings of the motor M10.

The inverter circuit 13 is controlled by the control circuit 14 to convert the stepped-up DC voltage to a 3-phase AC voltage which is supplied to the motor M11. The inverter circuit 13 also serves to discharge the accumulated charge of the smoothing capacitor 11, as described hereinafter. The inverter circuit 13 is formed of three switching circuits 130, 131 and 132, connected in parallel between the terminals of the smoothing capacitor 11. The switching circuit 130 is formed of two IGBTs 130a and 130b connected in series, the switching circuit 131 is formed of two IGBTs 131a and 131b connected in series, and the switching circuit 132 is formed of two IGBTs 132a and 132b connected in series. The junction points of the IGBTs 130a, 130b, of the IGBTs 131a, 131b, and of the IGBTs 132a, 132b are respectively connected to windings of the motor M11. The operation of the inverter circuit 13 is identical to that of the inverter circuit 12 described above.

The control circuit 14 controls the switching circuits 120, 121 and 122 of the inverter circuit 12, and the switching circuits 130, 131 and 132 of the inverter circuit 13 to convert the smoothed stepped-up DC voltage to the 3-phase AC voltages that are supplied to the motors M10 and M11. The control circuit 14 is connected to the emitter and gate terminals of each of the IGBTs of the switching circuits 101, 120, 121, 122, 130, 131 and 132, for controlling respective gate voltages (i.e., gate-emitter voltages) of these IGBTs.

Figure 2:
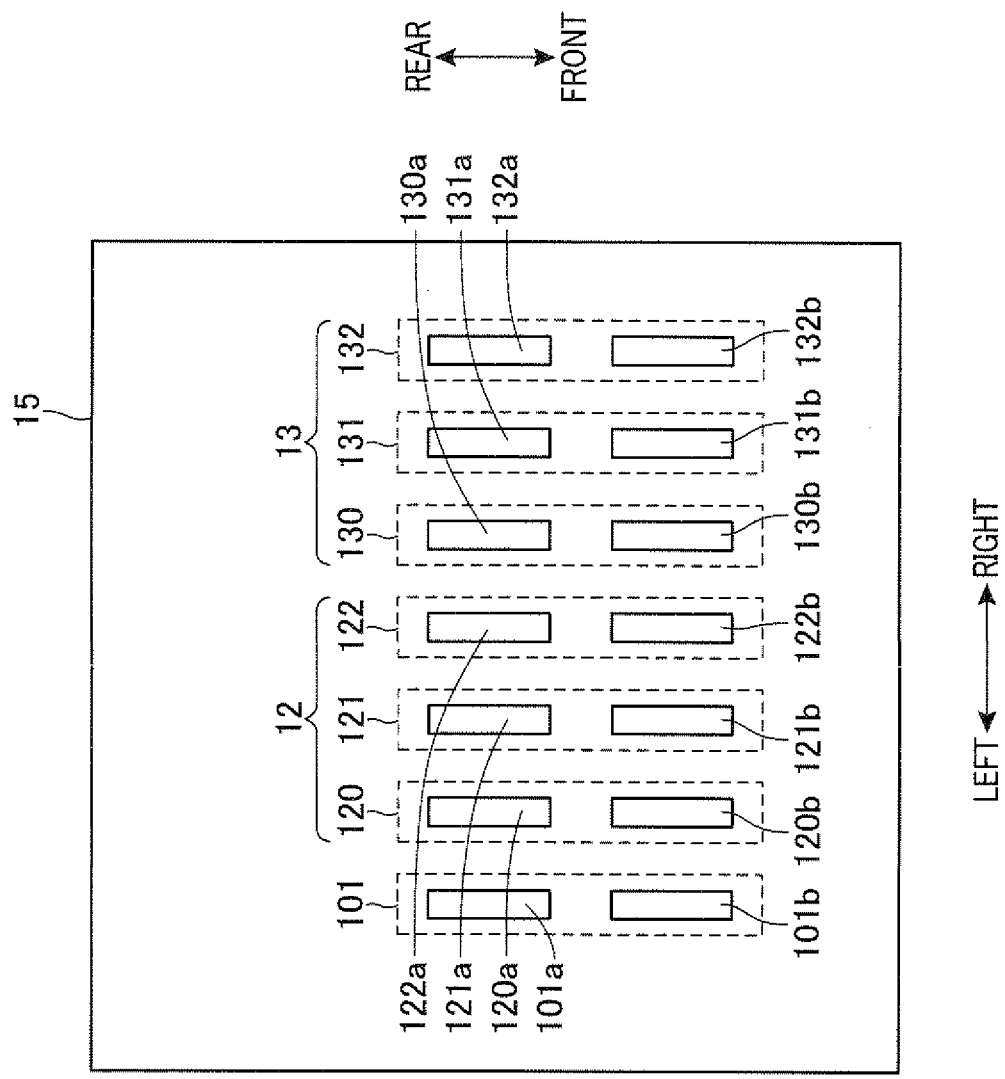
FIG. 2 is a plan view of a circuit board having components shown in FIG. 1 mounted thereon.
Figure 3:
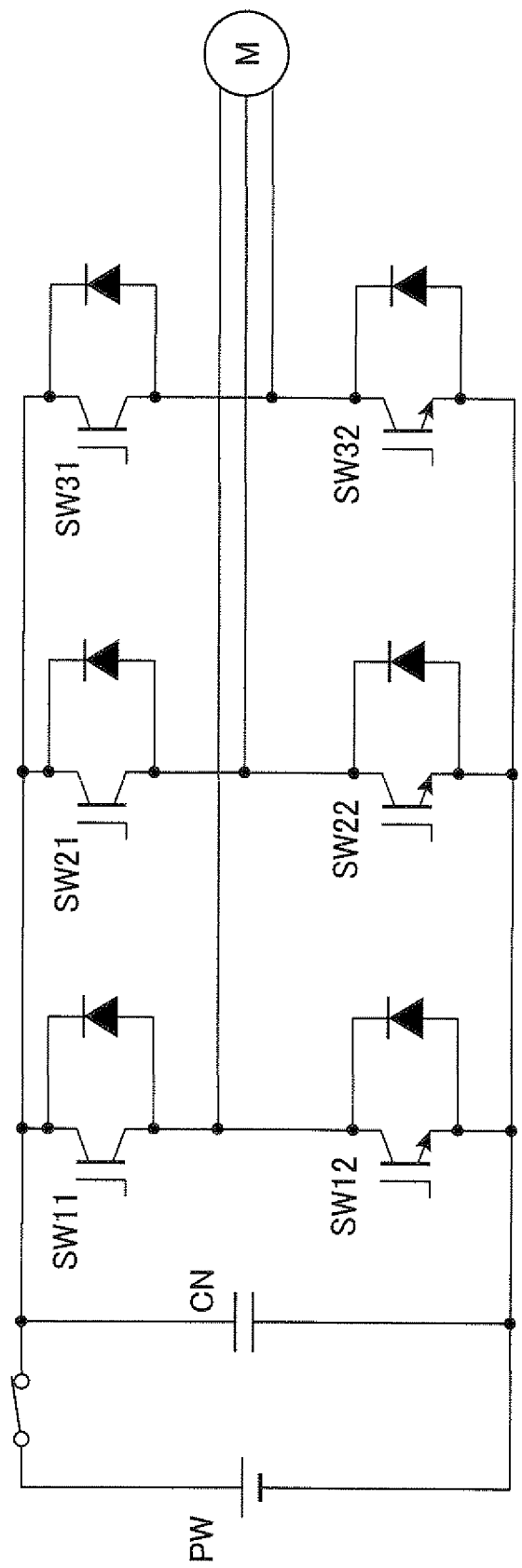
FIG. 3 is a partial circuit diagram for describing a capacitor discharge function of a prior art example of a motor control apparatus.

FIG. 2 is a plan view illustrating position relationships between the switching circuits of the converter circuit 10 and of the inverter circuits 12 and 13, on a circuit board 15. As shown, the switching circuits 120 to 122 of the inverter circuit 12 are arrayed successively from left to right on the circuit board 15, and the switching circuits 130 to 132 are similarly arrayed. In addition, the two IGBTs of each switching circuit are respectively positioned at frontward and rearward positions on the circuit board 15.

The operation of the motor control apparatus will be described referring to FIGS. 1 and 2. When the vehicle ignition switch (of the vehicle in which the motor control apparatus is installed) is switched on, the relays R10 and R11 become closed, and operation of the motor control apparatus 1 is thereby started. The control circuit 14 controls the IGBTs 101a, 101b of the converter circuit 10 to perform step-up of the DC voltage of the battery B1, and supplies the stepped-up DC voltage (smoothed by the smoothing capacitor 11) to the inverter circuits 12 and 13. Based on externally supplied command signals (not shown in the drawings), the control circuit 14 controls the IGBTs of the switching circuits 120, 121 and 122 of the inverter circuit 12 to convert the smoothed stepped-up DC voltage to a set of 3-phase AC voltages which are supplied to the motor M10. Similarly, the control circuit 14 controls the IGBTs of the switching circuits 130, 131 and 132 of the inverter circuit 13 to convert the smoothed stepped-up DC voltage to 3-phase AC voltages which are supplied to the motor M11.

When the ignition switch of the vehicle is switched off, the relays R10, R11 become opened thereby disconnecting the battery B1 from the converter circuit 10, and so halting the supply of 3-phase AC power to the motor M10 and to the motor M11. At this time, the charge which has accumulated in the smoothing capacitor 11 remains unchanged. The control circuit 14 then sets the IGBTs of the switching circuit 101 of the converter circuit 10, the IGBTs of the switching circuits 120, 121 of the inverter circuit 12, and the IGBTs of the switching circuits 130, 131 of the inverter circuit 13 in the "off" state. Concurrent with this, the control circuit 14 sets the IGBTs of each of the switching circuits 122 of the inverter circuit 12 and the switching circuit 132 of the inverter circuit 13 in the "on" state. More specifically, in this "on" condition, an IGBT passes a collector current whose maximum value (saturation value) is essentially determined by the value of gate-emitter voltage applied to the IGBT by the control circuit 14.

The charge in the smoothing capacitor 11 is thereby discharged through these switching circuits 122 and 132.

As shown in FIG. 2, the switching circuits 122 of the inverter circuit 12 and 132 of the inverter circuit 13 are disposed on the circuit board 15 such that they are not positioned adjacent to one another.

As described above, the IGBTs 122a and 122b of the switching circuit 122 have respective power handling capabilities that are matched to the drive power capacity of the motor M10, and similarly the IGBTs 132a and 132b of the switching circuit 132 are matched to the drive power capacity of the motor M11, which may differ from that of the motor M10. For that reason, when the switching circuits 122 and 132 are concurrently switched to the "on" state to discharge the smoothing capacitor 11, the control circuit 14 applies respectively appropriate gate control voltages to the IGBTs 122a and 122b and to the IGBTs 132a and 132b. Specifically, the respective gate control voltages are predetermined to limit the maximum value of current which flows through each of the IGBTs 122a, 122b, 132a, 132b, to ensure that the power dissipated by each IGBT during discharging of the smoothing capacitor 11 will be in accordance with the power handling capabilities of the respective IGBTs.

Thus, after the relays R10, R11 are opened and the battery B1 thereby disconnected from the converter circuit 10, the charge stored in the smoothing capacitor 11 is discharged through a single one of the switching circuits of the inverter circuit 12 and a single one of the switching circuits of the inverter circuit 13. The danger of electric shock due to the residual charge in the smoothing capacitor 11 is thereby prevented.

The effects obtained with this embodiment are as follows. When the vehicle ignition switch is turned off, so that battery B1 becomes disconnected from the converter circuit 10, and the control circuit 14 then sets both of the IGBTs 122a and 122b of the switching circuit 122 in the on (conducting) state, all of the other IGBTs of the inverter circuit 12 are set in the off (non-conducting state). Thus there is no possibility that some discharge current from the smoothing capacitor 11 may flow momentarily through the windings of the motor M10 at that time (i.e., via any IGBTs of the switching circuits 120 or 121) due to timing deviations as described above concerning the prior art example. Similarly, even if the IGBTs 122a, 122b of the switching circuit 122 do not have identical values of collector-emitter resistance when in the on state, there is no possibility that this can cause some of the discharge current from the smoothing capacitor 11 to flow through the windings of the motor M10, via any IGBTs of the switching circuits 120 or 121. This is similarly true for the case of the inverter circuit 13 and the motor M11. Hence the above-described disadvantages of the prior art are effectively overcome.

Furthermore with the above embodiment it is ensured that an IGBT will not be destroyed, when passing a discharge current from the smoothing capacitor 11, due to the amount of dissipated power exceeding the power handling capability of the IGBT. The amount of power dissipated by an IGBT is the product of the collector current and the voltage between the emitter and collector terminals. When discharging the smoothing capacitor 11, the control circuit 14 controls the gate voltages of each of the IGBTs 122a, 122b, 132a and 132b in accordance with their respective power handling capabilities, i.e., such as to appropriately limit the respective levels of current flow through these IGBTs. The charge stored in the smoothing capacitor 11 can thereby be effectively discharged without danger of destruction of IGBTs.

Furthermore with the above embodiment, the switching circuit 122 of the inverter circuit 12 and the switching circuit 132 of the inverter circuit 13 are located at positions on the circuit board 15 which are not adjacent to one another. Thus when discharge current from the smoothing capacitor 11 flows through the switching circuits 122 and 132, and the resultant power dissipation causes heat to be generated by the IGBTs of these switching circuits, build-up of heat is prevented. Excessive temperature increase of the IGBTs 122a, 122b, 132a and 132b due to discharging of the smoothing capacitor 11 is thereby avoided.

Second Embodiment

With the first embodiment, discharging of the smoothing capacitor 11 is performed through one switching circuit of each of respective inverter circuits of the motor control apparatus. A second embodiment will be described, which differs from the first embodiment in that discharging of the smoothing capacitor 11 is also performed through the switching circuit of the converter circuit (DC-to-DC power converter).

The circuit configuration of the second embodiment is identical to that of the first embodiment, so that detailed description is omitted. The capacitor discharging operation will be described referring again to FIGS. 1 and 2.

When the vehicle ignition switch is turned off, so that the relays R10, R11 are opened and the DC voltage source (battery B1) is disconnected from the converter circuit 10, the control circuit 14 applies control signals to the IGBTs of the inverter circuits 12 and 13 as described above for the first embodiment. That is, each of the IGBTs 120a, 120b, 121a, 121b, 130a, 130b, 131a, 131b are set in the off state, while IGBTs 122a, 122b, and 132a, 132b are set in the on state. However with this embodiment, the IGBTs 101a, 101b of the switching circuit 101 are also set in the on state at that time. The smoothing capacitor 11 is thereby discharged by current which flows through one switching circuit of each of the inverter circuits 12 and 13, and also through the switching circuit 101 in the converter circuit 10.

As shown in FIG. 2, the switching circuit 101, the switching circuit 122 of the inverter circuit 12, and the switching circuit 132 of the inverter circuit 13 are located at positions on the circuit board 15 such that they are not mutually adjacent. Excessive temperature increase of the IGBTs 101a, 101b, 122a, 122b, 132a and 132b, due to discharging of the smoothing capacitor 11, is thereby avoided.

With the second embodiment, since discharge current from the smoothing capacitor 11 flows through the IGBTs of the switching circuit 101 in addition to flowing through the IGBTs of one switching circuit of the inverter circuit 12 and one switching circuit of the smoothing capacitor 11, the residual charge in the smoothing capacitor 11 can be efficiently discharged when the vehicle ignition switch become switched off. The danger of electric shock is thereby prevented. In addition, those switching circuits through which the capacitor discharge current passes are disposed separated from one another on the circuit board 15, so that the extent of heat build-up due to power dissipation (caused by passing the capacitor discharge current) can be minimized.

Third Embodiment

With a third embodiment, when one of the aforementioned single switching circuits of the inverters (i.e., a switching circuit used to pass a discharge current of the smoothing capacitor 11 as described for the preceding embodiments) becomes defective, the switching circuit of the converter circuit is utilised in place of the defective switching circuit, to pass the discharge current.

With the third embodiment, so long as each of switching circuits 122 and 132 of the inverter circuit 12 and the inverter circuit 13 are functioning normally, the operation of this embodiment is identical to that of the first embodiment described above, with discharge current from the smoothing capacitor 11 flowing through the switching circuit 122 of the inverter circuit 12 and the switching circuit 132 of the inverter circuit 13 after the battery B1 becomes disconnected. However the control circuit 14 of this embodiment is provided with a failure diagnosis function, for detecting a defective condition of any of the switching circuits.

If it becomes detected by the control circuit 14 (prior to switch-off the ignition switch of the vehicle) that either the switching circuit 122 of the inverter circuit 12 or the switching circuit 132 of the inverter circuit 13 is defective, then when the ignition switch has been switched off and the battery B1 thereby disconnected from the motor control apparatus 1, the control circuit 14 then applies control signals to the inverter circuit 12, the inverter circuit 13 and the switching circuit 101 for performing the following operations. It will be assumed for example that it has been detected that the switching circuit 122 is defective. In that case, when the relays R10, R11 have become opened, the control circuit 14 sets all of the IGBTs of the switching circuits 120, 121 and 122 of the inverter circuit 12 to the off state, and also sets each of the IGBTs of the switching circuits 130 and 131 of the inverter circuit 13 to the off state. Concurrent with this, the control circuit 14 sets the IGBTs 132a, 132b of the switching circuit 132 of the inverter circuit 13, and the IGBTs 101a, 101b of the switching circuit 101 of the, to the on state.

In that way the charge stored in the smoothing capacitor 11 becomes efficiently discharged, by current which flows through the switching circuits 101 of the converter circuit 10 and 132 of the inverter circuit 13.

Similarly, if it becomes detected by the control circuit 14 (prior to switch-off the ignition switch of the vehicle) that the switching circuit 132 is functioning abnormally, then when the ignition switch has been switched off, the following operations are performed. The control circuit 14 sets each of the IGBTs of the switching circuits 130, 131 and 132 of the inverter circuit 13 to the off state, and also sets each of the IGBTs of the switching circuits 120 and 121 of the motor control apparatus 1 to the off state. Concurrent with this, the control circuit 14 sets the IGBTs 122a, 122b of the inverter circuit 12, and the IGBTs 101a, 101b of the switching circuit 101 of the converter circuit 10, to the on state.

Hence in this case too the charge stored in the smoothing capacitor 11 becomes efficiently discharged, by current which flows through the switching circuits 101 and 122.

The advantages of this embodiment are as follows. It is ensured that, both for the case in which each of the switching circuits 122 or 132 are functioning normally, and the case in which one of these switching circuits has become defective, the discharge current from the smoothing capacitor 11 will flow through two switching circuits which are connected in parallel. The smoothing capacitor 11 can thereby be effectively discharged, and the danger of electric shock thus prevented, even if a switching circuit such as circuit 122 or 132 has become defective. Furthermore, for the same reasons as described for the first and second embodiments, it is ensured that current will not flow through the windings of either of the motors M10 and M11 when discharging of the smoothing capacitor 11 is performed.

With the embodiments described above, discharge current from the smoothing capacitor 11 is passed through the switching circuits 122 and 132 of the inverter circuits 12 and 13 respectively. However the invention is not limited to use of any specific switching circuit of an inverter circuit for this purpose, and it would be equally possible to use any other single switching circuit of each inverter circuit to pass the discharge current from the smoothing capacitor 11.

Furthermore with the embodiments described above, each inverter circuit is formed of three switching circuits connected in parallel. However the invention would be equally applicable to a motor control apparatus in which each inverter circuit is formed of a greater number of switching circuits connected in parallel.

Furthermore with the first embodiment described above, discharge current from the smoothing capacitor 11 is passed through two switching circuits (122 and 132), disposed on the circuit board 15, which are not located mutually adjacent and have the specific position relationship shown in FIG. 2. Similarly with the second and third embodiments, the three switching circuits (101, 122 and 132) used for this purpose, which are not located mutually adjacent, have the specific position relationship shown in FIG. 2. However it should be noted that the invention is not limited to the use of switching circuits having these specific position relationships on the circuit board 15, for passing the discharge current from the smoothing capacitor 11. It is only necessary to ensure that these switching circuits are not located adjacent to one another on the circuit board 15.

The invention has been described above with reference to the motor control apparatus configuration shown in FIG. 1, in which a plurality of inverter circuits (DC-to-AC inverter circuits) of respective motors operate from a stepped-up DC voltage that is produced by a converter circuit (DC-to-DC converter circuit) of the motor control apparatus, with the stepped-up DC voltage being smoothed by a smoothing capacitor. However it will be apparent that the invention is equally applicable to a motor control apparatus in which a plurality of inverter circuits of respective motors operate from a DC voltage produced from a source (battery or DC power supply circuit) which is independent of the motor control apparatus, with that DC voltage being smoothed by a smoothing capacitor of the motor control apparatus. In that case, the operation would be similar to that of the first embodiment, with the switching elements of a single switching circuit of each of the inverter circuits being set in the "on" state after the DC source becomes disconnected from the motor control apparatus and with all other switching elements being set in the "off" state, to thereby discharge the smoothing capacitor by current flowing through the "on" state switching circuits.

What is claimed is:

1. A motor control apparatus comprising:
a smoothing capacitor coupled to a source of a DC voltage, to provide a smoothed DC voltage between opposing terminals of said smoothing capacitor;
a control circuit, and a plurality of DC-to-AC inverter circuits connected to respectively corresponding ones of a plurality of electric motors, each of said DC-to-AC inverter circuits comprising a plurality of switching circuits respectively controlled by said control circuit, all of said switching circuits being connected in parallel between said opposing terminals of said smoothing capacitor, each of said switching circuits comprising a pair of switching elements connected in series, with a junction of each of said pairs of switching elements of a DC-to-AC inverter circuit being connected to said corresponding electric motor, each of said switching circuits controlled by said control circuit for converting said smoothed DC voltage to an AC voltage and supplying said AC voltage to said corresponding electric motor;
said control circuit responding to removal of said DC voltage source by setting both of respective switching elements of a switching circuit in a conducting condition, for discharging a residual charge of said smoothing capacitor;
wherein said control circuit is configured to respond to said removal of the DC voltage source by setting both of respective switching elements of a single switching circuit of each of said plurality of DC-to-AC inverter circuits in a conducting condition, for discharging said residual charge, while setting all other switching elements of said switching circuits in a non-conducting condition.

2. A motor control apparatus as claimed in claim 1, wherein said switching circuits of said plurality of DC-to-AC inverter circuits are disposed in a regular array pattern on a circuit board, and wherein said single switching circuits of said DC-to-AC inverter circuits are disposed at respective positions other than mutually adjacent positions, in said array pattern.

3. A motor control apparatus as claimed in claim 1, comprising a DC-to-DC converter circuit connectable to a source of a DC voltage and controlled by said control circuit for converting said DC voltage of said source to a stepped-up DC voltage, and wherein said smoothing capacitor provides said smoothed DC voltage by smoothing said stepped-up DC voltage, said DC-to-DC converter circuit comprising a pair of switching elements connected in series between said opposing terminals of said smoothing capacitor;

wherein said control circuit is configured to respond to disconnection of said DC voltage source by setting both of a pair of switching elements of a single switching circuit of each of said plurality of DC-to-AC inverter circuits and both of said switching elements of said switching circuit of said DC-to-DC converter circuit in said conducting condition, for discharging said residual charge of said smoothing capacitor, while setting all other switching elements of said switching circuits in said non-conducting condition.

4. A motor control apparatus as claimed in claim 3, wherein said switching circuits of said plurality of inverter circuits and said switching circuit of said DC-to-DC converter circuit are disposed in a regular array pattern on a circuit board, and wherein said single switching circuits of said inverter circuits and of said DC-to-DC converter circuit are disposed at respective positions other than mutually adjacent positions, in said array pattern.

5. A motor control apparatus as claimed in claim 3, wherein said control circuit is configured with a function for detecting a defective condition of any of said switching circuits of said DC-to-AC inverter circuits, and wherein so long as none of said switching circuits are detected as being defective, said control circuit responds to disconnection of said DC voltage source by setting both of a pair of switching elements of a single switching circuit of each of said plurality of DC-to-AC inverter circuits in said conducting condition, for discharging said residual charge, while setting all other switching elements of said switching circuits in said non-conducting condition;

and wherein after one of said single switching circuits has been detected as being defective, said control circuit responds to said disconnection by:

setting both of respective switching elements of a single switching circuit of each of said DC-to-AC inverter circuits, other than said defective single switching circuit, in said conducting condition, and setting both of respective switching elements of said switching circuit of said DC-to-DC converter circuit in said conducting condition, in place of said defective switching circuit, while setting all other switching elements of said switching circuits in said non-conducting condition.

6. A motor control apparatus as claimed in claim 1, wherein said control circuit is configured to control respective amounts of power dissipated by switching elements of said switching circuits during discharging of said residual charge, in accordance with respectively predetermined power handling capabilities of said switching elements.

7. A motor control apparatus as claimed in claim 6, wherein said control circuit controls said respective amounts of power by determining respective values of current flow of said switching elements during said discharging.

8. A motor control apparatus as claimed in claim 7, wherein said switching elements comprise respective IGBTs (Insulated Gate Bipolar Transistors), and wherein said control circuit controls said respective amounts of power by determining respective values of current flow of said IGBTs during said discharging, through control of respective values of gate-emitter voltage applied to said IGBTs.

9. A motor control apparatus as claimed in claim 1, wherein said plurality of electric motors comprise respective motive drive power motors of a vehicle.

10. A motor control apparatus comprising:

a smoothing capacitor coupled to a source of a DC voltage, to provide a smoothed DC voltage between opposing terminals of said smoothing capacitor;

a control circuit, and one or more DC-to-AC converter circuits each connected to a corresponding electric motor, each of said DC-to-AC converter circuits comprising a plurality of switching circuits respectively controlled by said control circuit, all of said switching circuits being connected in parallel between said opposing terminals of said smoothing capacitor, each of said switching circuits comprising a pair of switching elements connected in series, with a junction of each of said pairs of switching elements of a DC-to-AC converter circuit being connected to said corresponding electric motor, each of said switching circuits controlled by said control circuit for converting said smoothed DC voltage to an AC voltage and supplying said AC voltage to said corresponding electric motor;

said control circuit responding to removal of said DC voltage source by setting both of respective switching elements of a switching circuit in a conducting condition, for discharging a residual charge of said smoothing capacitor;

wherein said control circuit is configured to respond to said removal of the DC voltage source by setting both of respective switching elements of a single switching circuit of each of said one or more DC-to-AC converter circuits in a conducting condition, for discharging said residual charge, while setting all other switching elements of said switching circuits of said DC-to-AC converter circuit in a non-conducting condition.

* * * * *